United States Patent

[11] 3,631,327

| [72] | Inventor | Ivan Salisbury Payne<br>Basingstoke, England |
| --- | --- | --- |
| [21] | Appl. No. | 34,701 |
| [22] | Filed | May 5, 1970 |
| [45] | Patented | Dec. 28, 1971 |
| [73] | Assignee | Lansing Bagnall Limited<br>Basingstoke, England |
| [32] | Priority | May 5, 1969 |
| [33] | | Great Britain |
| [31] | | 22,880/69 |

[54] DEVICES FOR SENSING RELATIVE ROTATIONAL DISPLACEMENT
10 Claims, 4 Drawing Figs.

[52] U.S. Cl.................................... 318/628,
318/640
[51] Int. Cl...................................... G05b 11/01
[50] Field of Search........................... 318/640,
628

[56] References Cited
UNITED STATES PATENTS

| 3,135,903 | 6/1964 | Tomek | 318/640 |
| 2,686,896 | 7/1954 | Mathews | 318/628 X |
| 2,484,790 | 10/1949 | Hartig | 318/640 |
| 2,945,167 | 7/1960 | Gunther | 318/640 |

*Primary Examiner*—Benjamin Dobeck
*Attorney*—Martin Kirkpatrick

ABSTRACT: A device for sensing relative rotation between two members comprises two discs mounted on the members respectively, one disc having two areas of light-polarizing material each disposed opposite a corresponding area of light-polarizing material on the other disc. A light source transmits light through each pair of opposing discs, and two light-sensitive devices are disposed to receive the light transmitted through the pairs of opposing discs respectively. The discs of light-polarizing material are orientated to polarize the light in such planes that when there is rotational displacement from a datum position there is a decrease in the amount of light falling on one device and an increase in the light falling on the other device, the variation depending on the angle of displacement.

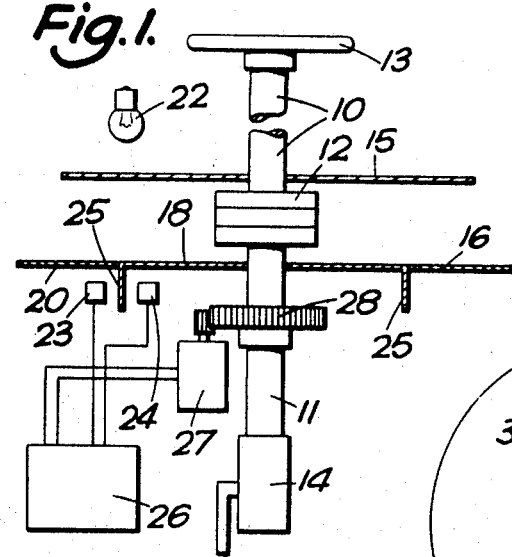
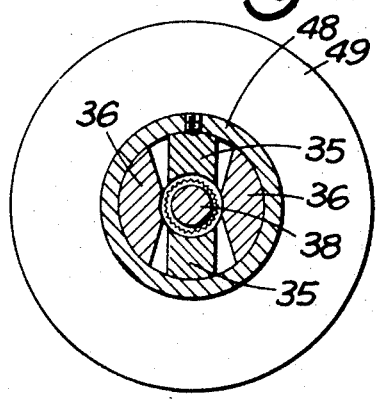
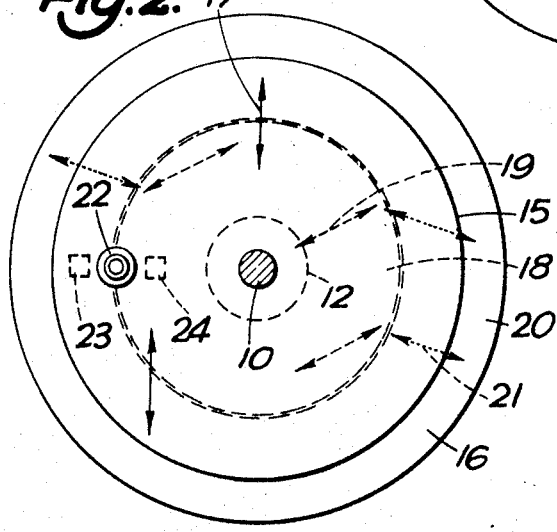

DEVICES FOR SENSING RELATIVE ROTATIONAL DISPLACEMENT

According to the invention a device for sensing the relative rotational displacement between a pair of relatively rotatable members comprises two relatively rotatable elements for rotation with said members respectively, one element having two bodies of light-polarizing material each disposed opposite a corresponding body of light-polarizing material on the other element, a light source or sources arranged to transmit light through each pair of opposing bodies, and two light-sensitive devices disposed to receive the light transmitted through the pairs of opposing bodies respectively, the bodies of light-polarizing material being orientated to polarize the light in such planes that when relative rotation occurs from a datum position the angle between the polarization planes in one pair increases and in the other pair decreases.

Thus, when relative rotation occurs from the datum position, there is a decrease in the amount of light transmitted through those bodies where the angle is increasing, and there is an increase in the light transmitted through those bodies where the angle is decreasing. The intensity of light falling on the light-sensitive devices therefore changes and this change is indicative of the relative rotation between the members.

In the case where the two relatively rotatable members are connected by a torsionally resilient structure the relative displacement between the members will be dependent on the torque causing the displacement and the device may therefore be used for sensing this torque. For example the two relatively rotatable members might be different portions of a torsionally resilient shaft or they may be connected by a torsionally resilient coupling.

Throughout this specification the term "light" is to be understood to include radiation in the invisible as well as in the visible wavebands. For example, the light source might be a source of infrared radiation and the light-sensitive devices might be responsive to such radiation.

Preferably the planes of polarization of the bodies are such that in the datum position the angles between the polarization planes in the two pairs of opposing bodies are substantially equal.

The polarization planes of the two bodies on one element may be parallel and the polarization planes of the two bodies on the other element may be inclined to one another. In this case the two bodies on said one element may comprise different portions of a single large body.

In any of the above arrangements each body of light-polarizing material may be in the form of a flat panel of such material.

The panels on each element may be annular and coaxial with the axis of rotation of the element.

Preferably the two elements are themselves coaxial.

Preferably shielding means are provided between the two light-sensitive devices to prevent the light transmitted by one pair of bodies from falling on the light-sensitive device associated with the other pair of bodies.

The displacement-sensing device according to the invention is particularly applicable to power steering transmissions for vehicles. According to another aspect of the invention, therefore, a power steering transmission for vehicles comprises two relatively rotatable members to which relative rotation may be applied manually, a device as described above being connected between the two members and said light-sensitive devices controlling means for powering the transmission in such manner that the power applied to the transmission by said means is dependent on the extent and direction of relative rotational displacement applied between the two members.

The two relatively rotatable members may be connected by a torsional coupling so that relative rotation between the members applies a torque to the transmission, said light-sensitive devices controlling said power means in such a manner as to assist the manually applied torque.

The following is a more detailed description of one embodiment of the invention reference being made to the accompanying drawings in which:

FIG. 1 is a diagrammatic drawing of a power-assisted steering transmission for a vehicle incorporating a device according to the invention;

FIG. 2 is a plan view of a part of the device used in the transmission;

FIG. 4 is a section along the line 4—4 of FIG. 3.

Figure 3:
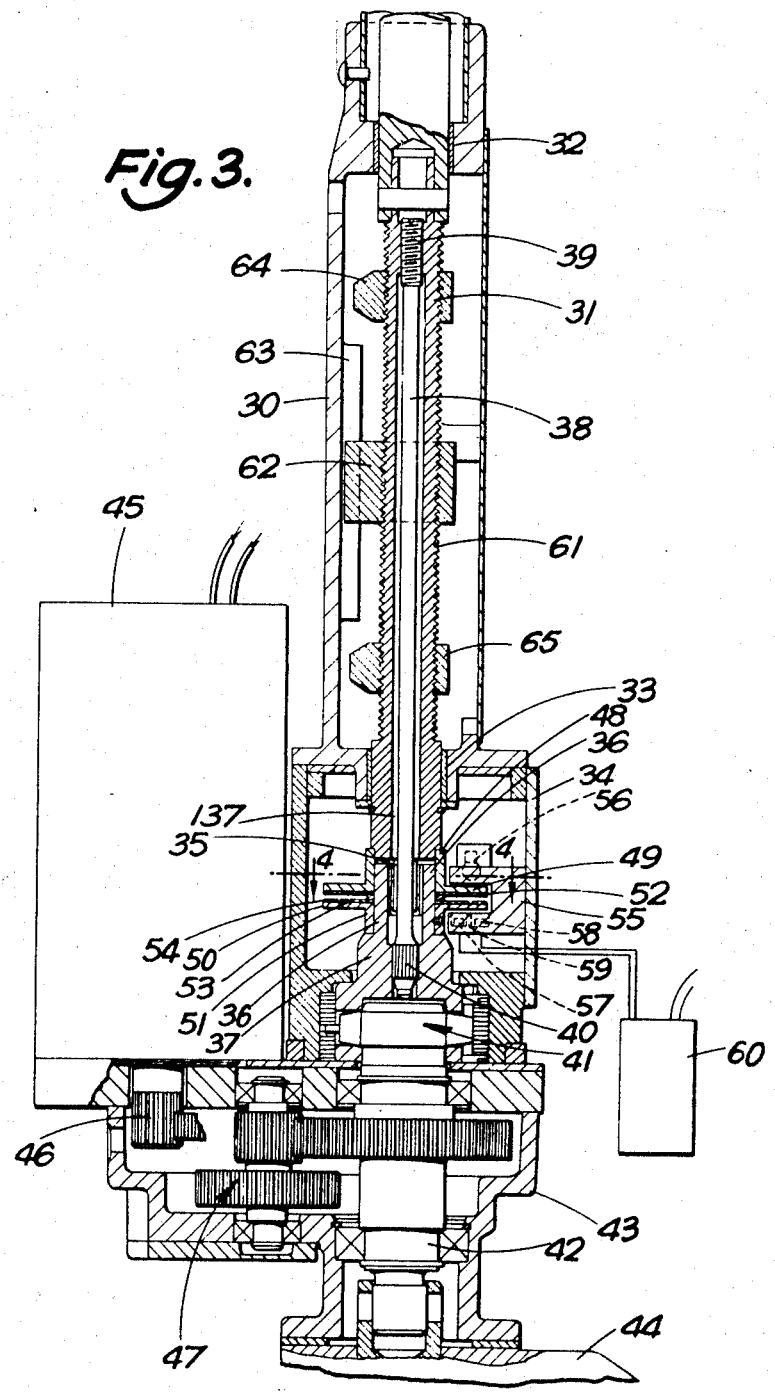
FIG. 3 is a vertical section showing in greater detail a power-assisted steering transmission for a motor vehicle.

Referring to FIG. 1 the steering column of the vehicle comprises two shafts 10 and 11 connected by a torsionally resilient coupling 12. The shaft 10 carries the normal steering wheel 13 and the shaft 11 carries a steering box 14.

A disc 15 of light-polarizing material is mounted on the shaft 10 and overlies a disc 16 mounted on the shaft 11. The plane of polarization of the disc 15 is indicated by the arrow 17 in FIG. 2. The lower disc 16 comprises an inner circular portion 18 the polarization plane of which is indicated at 19, and an outer annular portion 20 the plane of polarization of which is indicated at 21.

A light source 22 is mounted above the disc 15 and transmits light through the discs on to photoresistive devices 23 and 24 disposed below the portions 20 and 18 respectively of the lower disc. A downwardly projecting wall 25 is disposed around the junction between the two parts 18 and 20 so that light passing through one part does not fall on the photoresistive device beneath the other part.

The devices 23 and 24 are connected to electronic pulse control gear 26 which controls an electric motor 27 which is coupled to the shaft 11 through gearing 28.

The pulse control gear may be of the kind described in U.S. Pat. No. 3,562,616 the two photoresistive devices 23 and 24 being included in series with, or in place of, the fixed resistors R2 which themselves are connected in series with the magnetodependent resistors which control the two directions of rotation of the motor 27. In this case the permanent magnet or control 32 described in U.S. Pat. No. 3,562,616 are preset.

In the datum position of the steering transmission in which no torque is applied manually to the steering wheel 13 and discs 15 and 16 are in the relative position shown in FIG. 2 in which the planes of polarization of the parts 18 and 20 of the lower disc are equally inclined to the plane of polarization of the upper disc 15 so that the two photoresistive devices 23 and 24 receive substantially equal intensities of light from the light source 22. When the steering wheel is rotated to steer the vehicle a torque is applied and the torsionally resilient coupling 12 yields and the shaft 10 rotates relatively to the shaft 11 and there is consequently relative rotation between the discs 15 and 16. If the steering wheel is rotated clockwise the plane of polarization of the upper disc 15 approaches the plane of polarization of the portion 18 of the lower disc 16 and thus the intensity of light received by the photoresistive device 24 increases. Similarly the plane of polarization of the upper disc moves away from the plane of polarization of the portion 20 of the lower disc and thus the intensity of light received by the device 23 decreases. The pulse control gear responds to these changes to operate the motor 27 to apply an assisting torque to the shaft 11.

Similarly if the steering wheel is rotated anticlockwise the intensity of light received by the device 23 increases and that received by the device 24 decreases and the motor 27 is rotated in the opposite direction to apply an anticlockwise torque to the shaft 11.

The shafts 10 and 11 may be so coupled that a predetermined minimum torque is required to cause relative rotation between them. In this case, under small loads, the discs will rotate together with no activation of the light-sensitive devices. These only become activated when sufficient torque is produced to cause relative rotation of the shafts.

FIGS. 3 and 4 show in greater detail the application of the invention to a power-assisted steering transmission such as may be used, for example, on an industrial truck, such as a fork lift or pallet truck.

Referring to FIG. 3 the steering mechanism comprises a fixed tubular casing 30 within which is rotatable a steering shaft which is formed in two parts. The upper part 31 of the steering shaft is tubular and is rotatably mounted in bearings 32 and 33 within the casing 30. A steering wheel (not shown) is mounted on the upper end of the steering shaft part 31.

Connected to the bottom of the casing 30 is a larger casing part 34 which houses the sensing device. The lower end of the shaft part 31 projects into the casing 34 and is formed with axially extending lugs 35 which, as best seen in FIG. 4 are disposed on opposite sides of the central bore 137 in the shaft part 31.

The lugs 35 are received between lugs 36 which project upwardly from the upper end of the second part 37 of the steering shaft. As best seen in FIG. 4 the lugs 35 and 36 are so shaped as to permit a small degree of relative rotational movement between the shaft parts 31 and 37. In the arrangement shown the total relative movement is about 15° in each direction from the central position shown in FIG. 4.

The two shaft parts 31 and 37 are connected together by a torsion rod 38. The upper end of the torsion rod 38 is secured at 39 to the upper end of the shaft part 31 and the lower end of the torsion rod 38 is splined at 40 to the lower shaft part 37.

The lower shaft part 37 is connected through an antikickback device 41 to a shaft 42 rotatably mounted in bearings in a gear casing 43 secured to the lower end of the casing 34. The shaft 42 transmits rotation of the steering shaft to a conventional steering box 44 from which the steering movement is transmitted to the wheels of the vehicle in known manner.

An electric steering motor 45 is mounted on the gear casing 43 and the output shaft 46 of the motor is coupled through a gear transmission indicated generally at 47 to the shaft 42. The electric motor 45 is controlled by the sensing device associated with the steering mechanism which sensing device will now be described.

Within the casing 34, there is mounted on the lower end of the shaft part 31 around the lugs 35, a sleeve 48 integrally formed with a radially outwardly projecting flange 49. The flange 49 overlies and is spaced from a similar flange 50 which is integrally formed on a sleeve 51 which is secured to the lower shaft part 37. In each case the sleeves 48 and 51 are secured to their respective shaft parts by grub screws.

Each of the elements 48, 49 and 50, 51 is formed from transparent material. The lower face of the flange 49 has mounted thereon an annular disc 52 of light-polarizing material. The upper face of the lower flange 50 has mounted on it two concentric discs of light-polarizing material 53 and 54. The disc 52 corresponds to the disc 15 in the arrangement of FIG. 1 and the discs 53 and 54 correspond to the disc portions 18 and 20 respectively of the arrangement of FIG. 1. The planes of polarization of the three elements of polarizing material are arranged in a similar manner to the planes of polarization of the elements shown in FIGS. 1 and 2.

The peripheries of the flanges 49 and 50 project into a recess in a sensing device 55 mounted on the wall of the casing 34. In the upper part of the device 55 is mounted a lamp 56 arranged to transmit light through the flanges 49 and 50 and the polarizing material which they carry. Light passing through the disc 53 falls on a photoresistive device 57 and light passing through the disc 54 falls on a similarly photoresistive device 58. The devices 57 and 58 are housed in the base of recesses in the sensing device 55 and a wall 59 between the recesses forms a shield so that the device 57 cannot receive light transmitted through the disc 54 and the device 58 cannot receive light transmitted through the disc 53.

The devices 57 and 58 are connected to electronic pulse control gear 60 which controls the electric motor 45.

The arrangement operates in a similar manner to the arrangement described with respect to FIGS. 1 and 2. In the datum position of the steering transmission in which no torque is applied manually to the steering wheel the discs 52, 53 and 54 are in the neutral position corresponding to the positions of the discs 15, 18 and 20 in FIG. 2, in which the planes of polarization of the lower discs are equally inclined to the plane of polarization of the upper disc so that the two photoresistive devices 57 and 58 receive substantially equal intensities of light from the light source 56. When the steering wheel is rotated to steer the vehicle a torque is applied and the torsion shaft 38 yields and the upper shaft part 31 rotates relatively to the lower shaft part 37 and there is consequent relative rotation between the flanges 49 and 50. The pulse control gear 60 responds to the changes in light intensity falling on the devices 57 and 58 to operate the motor 45 to apply an assisting torque to the shaft 42 through the gear transmission 47.

It will be appreciated that should there for any reason be a failure of the power drive to the steering then continued rotation of the upper shaft part 31 will cause the lugs 35 to engage the lugs 36 so that the lower shaft part 37 will be rotated directly and mechanically. Thus manual steering is automatically retained should there be any failure in the power assistance system.

To limit rotational movement of the steering shaft the shaft part 31 is formed on its outer surface with a screw thread 61 which carries a block 62 which is held against rotation by engaging a guide 63 on the inner surface of the casing 30. The block 62 moves up or down according to the direction of rotation of the steering shaft and after a predetermined rotation of the shaft the block 62 engages an upper abutment 64 or a lower abutment 65 secured on the shaft 31 and thus prevents further rotation of the steering shaft.

Although the device has been described as applied to a power-assisted steering transmission it will be appreciated that the device may be used in many different ways for sensing relative rotation between a pair of relatively rotatable members. The light-sensitive devices may be arranged to operate many different kinds of further devices upon a predetermined extent of rotational displacement between the members, or in the case where the members are coupled by a torsionally resilient structure, the operation of the further device may depend on the torque causing the relative displacement. For example the device may be used as an overload device arranged to cut out an electric motor when a particular torque caused by the motor exceeds a predetermined value. For example there are forms of industrial lift truck in which the load supporting structure is raised and lowered by rotating screws and in this case the device may be used as an overload device associated with the screws.

Instead of the light-sensitive devices operating further devices, as in the arrangements described, they may be arranged simply to indicate the extent of rotational displacement or the torque causing the relative displacement.

Where the device is simply to detect a relative displacement the two relatively rotatable members need not be coupled together. The arrangement could be used for example to detect a difference in speed between two shafts arranged normally to rotate in synchronism.

The light source need not necessarily be a source of visible light and could equally well be a source of infrared or other invisible radiation and in this case the sensitive devices would be such as to be responsive to such radiation.

I claim:

1. A device for sensing the relative rotational displacement between a pair of relatively rotatable members comprising two relatively rotatable elements for rotation with said members respectively, first and second bodies of light-polarizing material on one of said elements, third and fourth corresponding bodies of light-polarizing material on the other element disposed opposite the first and second bodies respectively, a light source located to transmit light through each pair of opposing bodies, and two light-sensitive devices located to receive the light transmitted through the pairs of opposing bodies respectively, the plane of polarization of the third body, in a datum position, being displaced through an acute angle in one sense from the plane of polarization of the first body, and the plane of polarization of the fourth body, in the datum position, being displaced through an acute angle in the opposite sense from the plane of polarization of the second body, so that when relative rotation occurs from the datum position the angle between the polarization planes of one pair of bodies increases and the angle between the polarization planes of the other pair of bodies decreases.

2. A device according to claim 1 wherein the angles between the polarization planes in the two pairs of bodies are substantially equal in the datum position.

3. A device according to claim 1 wherein the body of the first and second bodies on one element are parallel and the polarization planes of the third and fourth bodies on the other element are inclined to one another.

4. A device according to claim 3 wherein the first and second bodies on said one element comprise different portions of a single large body.

5. A device according to claim 1 wherein each body of light-polarizing material is in the form of a flat panel of such material.

6. A device according to claim 5 wherein the panels on each element are annular and coaxial with the axis of rotation of the element.

7. A device according to claim 1 wherein the two elements are coaxial.

8. A device according to claim 1 including shielding means provided between the two light-sensitive devices for preventing light transmitted by one pair of bodies from falling on the light-sensitive device associated with the other pair of bodies.

9. A power steering transmission for vehicles comprising:
two relatively rotatable members to which relative rotation may be applied manually;
a device according to claim 1 connected between the two members; and,
light-sensitive devices controlling means for powering the transmission and operative for applying power to the transmission in a manner dependent on the extent and direction of relative rotation displacement applied between the two members.

14. A power steering transmission according to claim 9 wherein the two relatively rotatable members are connected by a torsional coupling so that relative rotation between the members applies a torque to the transmission, said light-sensitive devices controlling said power means in such a manner as to assist the manually applied torque.

* * * * *